US011054836B2

(12) United States Patent
Wang et al.

(10) Patent No.: US 11,054,836 B2
(45) Date of Patent: *Jul. 6, 2021

(54) AUTONOMOUS MOBILE ROBOT, METHOD FOR DOCKING AN AUTONOMOUS MOBILE ROBOT, CONTROL DEVICE AND SMART CLEANING SYSTEM

(71) Applicant: SHENZHEN ROCK TIMES TECHNOLOGY CO., LTD., Shenzhen (CN)

(72) Inventors: Lei Wang, Shenzhen (CN); Haojian Xie, Shenzhen (CN)

(73) Assignee: SHENZHEN ROCK TIMES TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/760,881

(22) PCT Filed: Sep. 21, 2018

(86) PCT No.: PCT/CN2018/106968
§ 371 (c)(1),
(2) Date: Apr. 30, 2020

(87) PCT Pub. No.: WO2019/057157
PCT Pub. Date: Mar. 28, 2019

(65) Prior Publication Data
US 2020/0387165 A1 Dec. 10, 2020

(30) Foreign Application Priority Data
Sep. 25, 2017 (CN) .......................... 201710875075.8

(51) Int. Cl.
G05D 1/02 (2020.01)
B25J 9/16 (2006.01)
B25J 11/00 (2006.01)

(52) U.S. Cl.
CPC .......... G05D 1/0225 (2013.01); B25J 9/1664 (2013.01); B25J 11/0085 (2013.01);
(Continued)

(58) Field of Classification Search
CPC ................. G05D 1/0225; G05D 1/024; G05D 2201/0215; G05D 1/028; G05D 1/0236;
(Continued)

(56) References Cited

U.S. PATENT DOCUMENTS 6,205,380 B1 3/2001 Bauer et al.
9,354,634 B2 5/2016 Ko
(Continued)

FOREIGN PATENT DOCUMENTS

CN 101738195 A 6/2010
CN 102608618 A 7/2012
(Continued)

OTHER PUBLICATIONS

International Search Report and Written Opinion received in PCT App. No. PCT/CN2018/106968 dated Jan. 23, 2019.
(Continued)

*Primary Examiner* — B M M Hannan
(74) *Attorney, Agent, or Firm* — Seed IP Law Group LLP

(57) ABSTRACT

The present disclosure is related to a method for docking an autonomous mobile robot. A first effective area is determined A first effective boundary is determined from the one or more first boundaries of the first effective area. An optimal point on the first effective boundary is determined. The autonomous mobile robot is controlled to move to the optimal point. The steps are repeated to make the autonomous mobile robot reach the vicinity of the charging station. The optimal point may be determined from one or more candidate optimal points. Each candidate optimal point defines a respective second effective area centering on the
(Continued)

candidate optimal point and overlapping with the first effective area to form a respective overlapping area. The respective overlapping area associated with the optimal point is smallest among the respective overlapping areas associated with the one or more candidate optimal points.

20 Claims, 8 Drawing Sheets

(52) U.S. Cl.
CPC ........ *G05D 1/024* (2013.01); *A47L 2201/022* (2013.01); *A47L 2201/04* (2013.01); *G05D 2201/0215* (2013.01)

(58) Field of Classification Search
CPC .. G05D 1/0242; G05D 1/0246; G05D 1/0255; G05D 1/0285; B25J 9/1664; B25J 11/0085; A47L 2201/022; A47L 2201/04; A47L 5/30; H02J 2310/48; H02J 7/00034; H02J 7/0027
USPC ................ 700/255, 258; 701/23; 318/568.12
See application file for complete search history.

(56) References Cited

U.S. PATENT DOCUMENTS

| | | | |
|---|---|---|---|
| 2006/0076039 A1 | 4/2006 | Song et al. | |
| 2007/0244610 A1* | 10/2007 | Ozick | A47L 9/2894 701/23 |
| 2008/0012518 A1 | 1/2008 | Yamamoto | |
| 2008/0184518 A1 | 8/2008 | Taylor et al. | |
| 2008/0249661 A1* | 10/2008 | Hong | G05D 1/0219 700/252 |
| 2010/0324731 A1* | 12/2010 | Letsky | G05D 1/0274 700/245 |
| 2010/0324736 A1 | 12/2010 | Yoo et al. | |
| 2011/0167574 A1* | 7/2011 | Stout | G05D 1/0219 15/3 |
| 2012/0265391 A1* | 10/2012 | Letsky | G05D 1/0088 701/25 |
| 2013/0214727 A1 | 8/2013 | Teng et al. | |
| 2016/0070268 A1 | 3/2016 | Ko | |
| 2017/0001311 A1* | 1/2017 | Bushman | A47L 9/2852 |
| 2017/0050311 A1* | 2/2017 | Yoo | A47L 9/2852 |
| 2018/0137675 A1* | 5/2018 | Kwant | G06T 17/20 |
| 2018/0370376 A1* | 12/2018 | Liu | A47L 9/2873 |
| 2020/0064838 A1* | 2/2020 | Izawa | G05D 1/0251 |
| 2020/0077860 A1* | 3/2020 | Lamon | G05D 1/0274 |
| 2020/0293055 A1 | 9/2020 | Wang et al. | |

FOREIGN PATENT DOCUMENTS

| | | |
|---|---|---|
| CN | 104040450 A | 9/2014 |
| CN | 104055462 A | 9/2014 |
| CN | 104765379 A | 7/2015 |
| CN | 105119338 A | 12/2015 |
| CN | 105259918 A | 1/2016 |
| CN | 105652876 A | 6/2016 |
| CN | 106200645 A | 12/2016 |
| CN | 106308685 A | 1/2017 |
| CN | 205970884 U | 2/2017 |
| CN | 106774295 A | 5/2017 |
| CN | 107041718 A | 8/2017 |
| JP | H03327 A | 1/1991 |
| JP | 2008181177 A | 8/2008 |
| JP | 2009112723 A | 5/2009 |
| JP | 6104715 B2 | 3/2017 |
| TW | M541825 U | 5/2017 |
| WO | 2013182941 A1 | 12/2013 |
| WO | 2017071372 A1 | 5/2017 |

OTHER PUBLICATIONS

English translation of International Search Report for PCT Application No. PCT/CN2018/105836, dated Dec. 21, 2018.
English translation of Office Action for CN Application No. 201710875075.8, dated Dec. 3, 2020.
English Translation of Office Action for CN Application No. 201710876877.0, dated Oct. 26, 2020.
Extended European Search Report for EP Application 18857524.5, dated Mar. 29, 2021, 9 pages.

* cited by examiner

AUTONOMOUS MOBILE ROBOT, METHOD FOR DOCKING AN AUTONOMOUS MOBILE ROBOT, CONTROL DEVICE AND SMART CLEANING SYSTEM

This application is a national phase application under 35 U.S.C. § 371 of International Patent Application No. PCT/CN2018/106968, filed on Sep. 21, 2018 which claims priority to a Chinese application No. 201710875075.8 filed on Sep. 25, 2017; titled "AUTONOMOUS MOBILE ROBOT, METHOD FOR DOCKING AN AUTONOMOUS MOBILE ROBOT, CONTROL DEVICE AND SMART CLEANING SYSTEM". The entirety of the above-mentioned applications are hereby incorporated by reference herein.

TECHNICAL FIELD

The present disclosure relates to a technical field of robot technology, and particularly to an autonomous mobile robot, a method for docking an autonomous mobile robot, a control device and a smart cleaning system.

BACKGROUND

Nowadays, autonomous mobile robots are becoming more prevalent. An autonomous mobile robot is generally equipped with a charging station. When the autonomous mobile robot is in the low energy level, it can be charged at the charging station. In the conventional docking method, the charging station transmits homing signals, and the autonomous mobile robot receives the signals. The control system of the autonomous robot controls the drive system based on the homing signals from the charging station. The autonomous mobile robot moves towards the charging station for charging.

However, in practice, the autonomous mobile robot cannot receive the homing signal smoothly due to the distance between the autonomous mobile robot and the charging station. In this case, docking the autonomous mobile robot is likely unsuccessful, and eventually the autonomous mobile robot reports error. On this occasion, users have to dock the autonomous mobile robot with manual operation, which lowers the user experience.

SUMMARY

A series of simplified forms of concepts are introduced in the summary, which will be described in further detail in the embodiments. The summary is not intended to limit the scope of protection of the claimed embodiments.

In order to at least partially solve the above technical problems, according to one aspect of the present disclosure, a method for docking an autonomous mobile robot is provided, the method includes the following steps.

Step S1: A first effective area is determined. Wherein the first effective area defined by one or more first boundaries, and the autonomous mobile robot is located in the first effective area.

Step S2: A first effective boundary is determined from the one or more first boundaries of the first effective area. The first effective boundary is in a coverage area of a homing signal of a charging station.

Step S3: An optimal point is determined on the first effective boundary. Wherein, a second effective area is defined in a circular area centering on a point on the first effective boundary, in a case that an overlapping area between the first effective area and the second effective area is the smallest, the center of the circular area is the optimal point.

Step S4: the autonomous mobile robot is controlled to move to the optimal point. And steps S1-S4 are repeated to make the autonomous mobile robot reach the vicinity of the charging station.

Optionally, the first effective area and the second effective area are areas without obstacles.

Optionally, the obstacles may include a wall.

Optionally, the autonomous mobile robot may include a confined area detector configured to detect a confined area.

Optionally, the autonomous mobile robot is controlled to move along a boundary of the confined area to approach the optimal point.

Optionally, the boundary of the confined area may include at least one of a virtual wall and a cliff edge.

Optionally, the confined area detector may include at least one of a virtual wall sensor and a cliff sensor, wherein the virtual wall sensor is configured to detect the virtual wall, and the cliff sensor is configured to detect the cliff edge.

Optionally, when a distance between the autonomous mobile robot and the charging station is equal to a predetermined distance, the autonomous mobile robot stops moving.

Optionally, the autonomous mobile robot may include a laser distance sensor to detect the distance between the autonomous mobile robot and the charging station.

Optionally, when the autonomous mobile robot detects a near-field signal of the charging station, the autonomous mobile robot stops moving.

The present disclosure also provides a control device for an autonomous mobile robot, the control device may include a non-transitory memory, a processor, and a computer program stored on the non-transitory memory, and when the processor executes the program, the steps of the above method are implemented.

The present disclosure also provides an autonomous mobile robot, the autonomous mobile robot includes a main body and the above control device, and the control device is disposed in the main body.

Optionally, the autonomous mobile robot may include a cleaning system.

The present disclosure also provides a smart cleaning system. The smart cleaning system may include one or more charging stations, and the autonomous mobile robot as described above.

According to the technical solutions provided by the embodiments of the present disclosure, docking an autonomous mobile robot can be achieved smoothly. If the autonomous mobile robot cannot receive homing signals from a charging station, or the charging station moves during docking the autonomous mobile robot, docking the autonomous mobile robot can be performed successfully by applying the technical solution of the present disclosure. Consequently, the process of the docking can be achieved without manual operation, which ensures reliability of the autonomous mobile robot and improves the user experience.

BRIEF DESCRIPTION OF THE DRAWINGS

The embodiments of the present disclosure will be described in more detail below with reference to the accompanying drawings, and the above and other objects, features and advantages of the present disclosure will become more apparent. The drawings are intended to provide a further explanation of the embodiments of the disclosure, the drawings constitute a part of the specification and are used to explain the disclosure together with the embodiments of the disclosure, and are not intended to limit the disclosure. In the figures, the same reference numerals generally refer to the same or similar parts.

DETAILED DESCRIPTION OF PREFERRED EMBODIMENTS

In order to make the objects, the technical solutions and the advantages of the present disclosure more apparent, the exemplary embodiments of the present disclosure will be described in detail below with reference to the accompanying drawings. It is apparent that the described embodiments are only a part of the embodiments of the present disclosure, and are not to be construed as limiting the embodiments of the present disclosure. All other embodiments obtained by those skilled in the art based on the embodiments of the disclosure described herein without departing from the scope of the disclosure are intended to fall within the scope of the disclosure.

Figure 1:
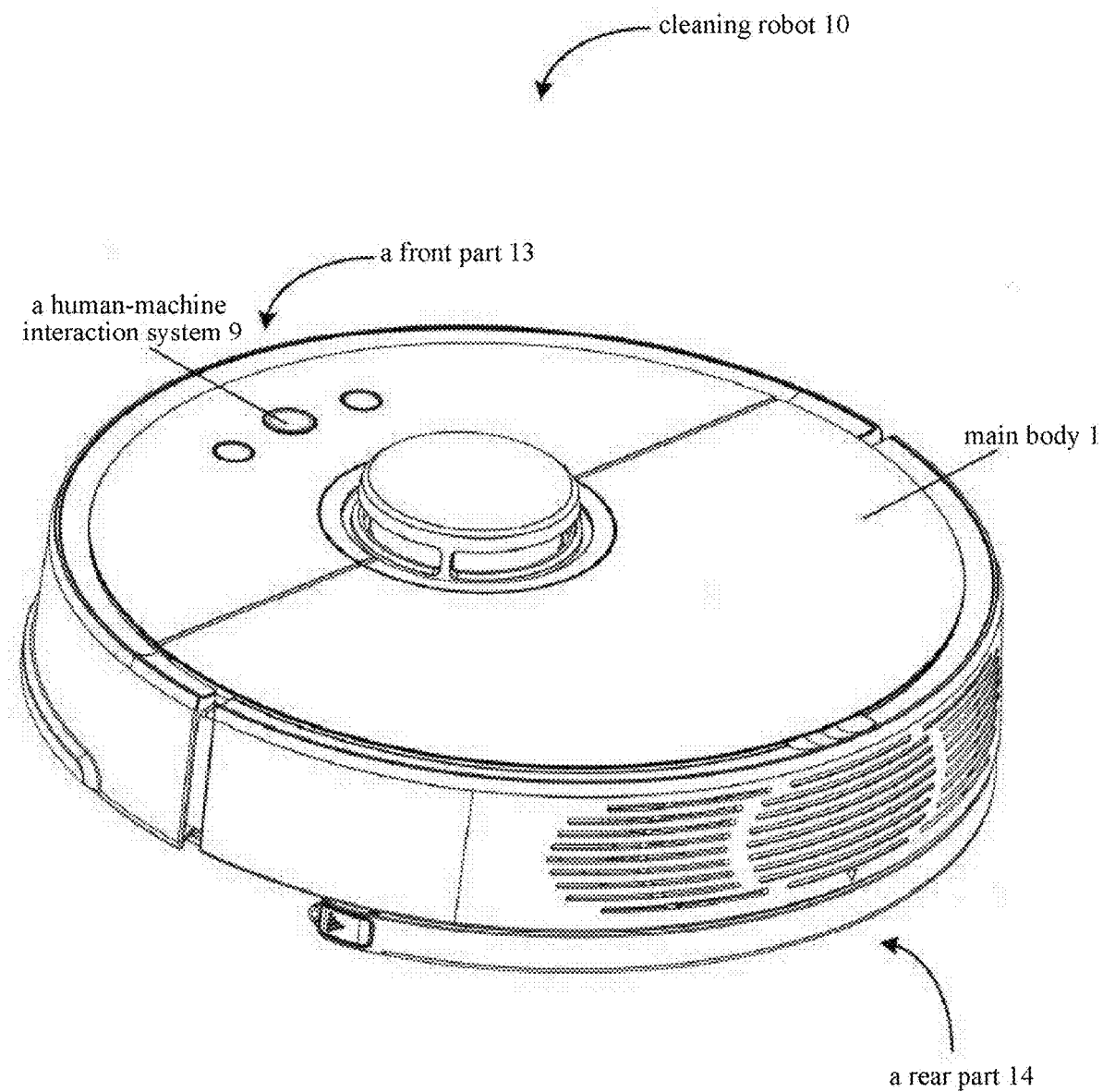
FIG. 1 is a top view of an autonomous mobile robot according to an embodiment of the present disclosure.
Figure 2:
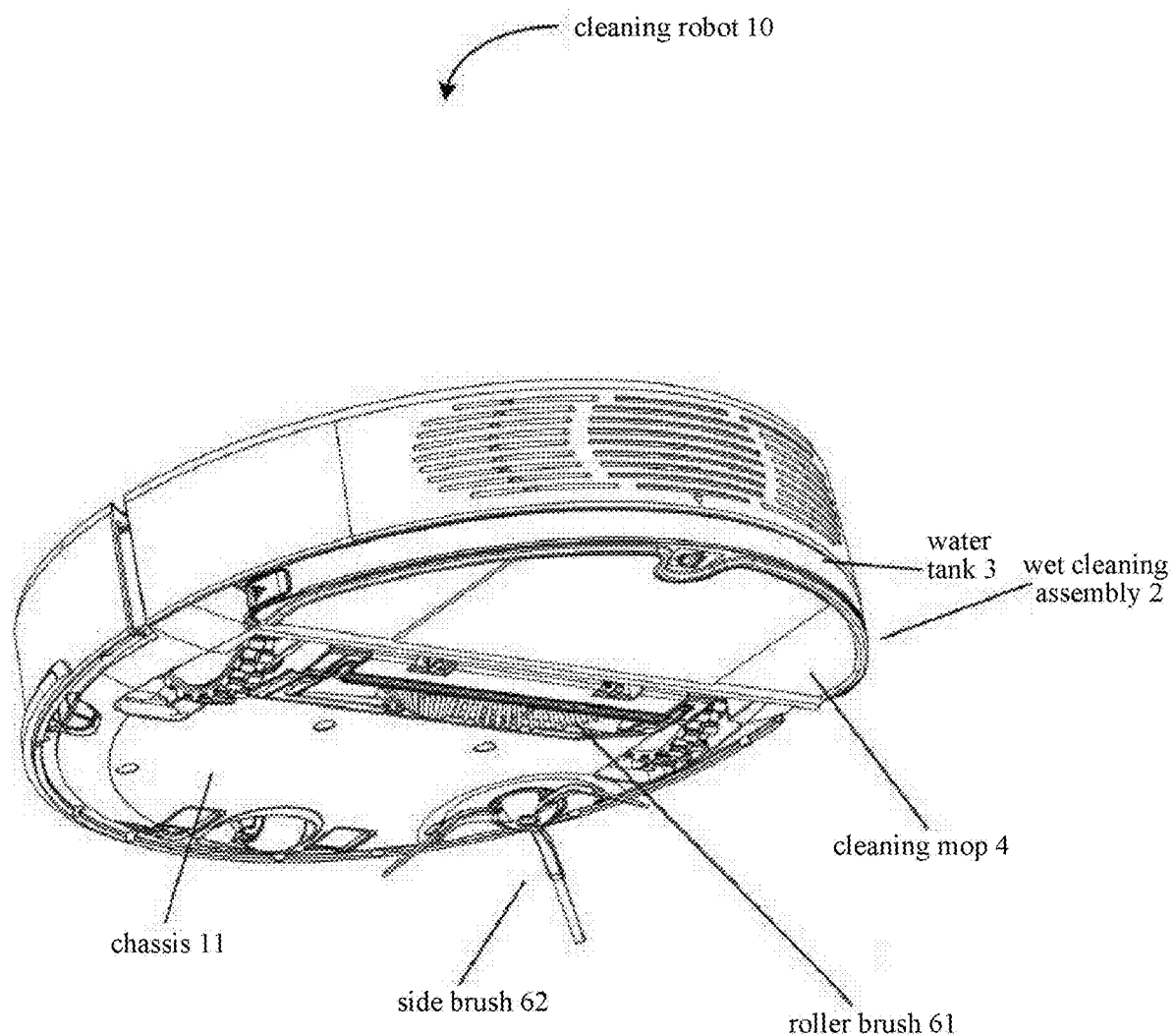
FIG. 2 is a bottom view of an autonomous mobile robot according to an embodiment of the present disclosure.

FIG. 1 and FIG. 2 are schematic views of an autonomous mobile robot according to an embodiment. The structure of the autonomous mobile robot is described in detail below.

In the illustrated embodiment, the autonomous mobile robot may be a cleaning robot 10. The cleaning robot 10 may include a sensor system, a control system, a driving system, a power system and a human-machine interaction system 9, in addition to a main body 1 and a cleaning system. The main parts of the cleaning robot are described in detail below.

The main body 1 may include an upper cover, a front part 13, a rear part 14, and a chassis 11, etc. The main body 1 may be substantially cylindrical. Alternatively, the main body 1 may also have other shapes, including but not limited to an approximate D shape.

The sensor system may include a position determination device disposed above the main body 1, a bumper disposed on the front part 13 of the main body 1, and sensing devices. The sensing devices may include an ultrasonic sensor, an infrared sensor, a magnetometer, an accelerometer, a gyroscope, an odometer, and the like. The sensing devices provide various location information and motion status information of the main body 1 to the control system. In some embodiments, the position determination device may include but not limited to an infrared transmitting and receiving device, a camera, and a laser detection sensor (LDS).

The cleaning system may include a dry cleaning assembly and a wet cleaning assembly. The wet cleaning assembly can wipe the surface to be cleaned (such as the ground) with a cleaning mop 4 containing cleaning liquid. The dry cleaning assembly is to clean debris on the surface to be cleaned by a cleaning head.

The function of the dry cleaning assembly may be achieved by an air duct including a roller brush 61, a dust container, a vacuum fan, an air outlet, and the connecting members among them. The roller brush 61 sweeps debris on the ground and brings it to the front of the suction port between the roller brush 61 and the dust container. And then the debris is conveyed into the dust container by an air suction stream generated by the vacuum fan and passing through the dust container. The dedusting capability of a cleaning robot can be characterized by DPU (dust pick up efficiency). The DPU is determined by the following factors: the structure and material of the roller brush 61, efficiencies of the air duct, and the type and power of the vacuum fan. Compared with the conventional vacuum cleaners, the improvement of dedusting capability is more meaningful for energy-limited cleaning robots. The improvement of the dedusting capability can reduce the frequency of charging. For example, the cleaning robot that can clean 80-square-meter ground with a single charge can be improved to clean 100-square-meter ground or more. As the frequency of charging is reduced, the battery life will increase and battery replacement frequency will decrease. The improvement of dedusting capability is an important factor for optimizing user experience because the user can sense whether the surface is clean after operation by the cleaning robot. The dry cleaning assembly may also include a side brush 62 having a rotating shaft. The rotating shaft is at an angle substantially perpendicular to the ground. The rotating shaft is configured to move the debris into the cleaning area of the roller brush 61.

The wet cleaning assembly may mainly include a water tank 3, a cleaning mop 4, and the like. The water tank 3 serves as the base for carrying other components of the wet cleaning assembly 2. The cleaning mop 4 is detachably disposed on the water tank 3. The liquid in the water tank 3 flows to the cleaning mop 4. The cleaning mop 4 wipes the ground cleaned by the roller brush.

The driving system is configured to drive the main body 1 and components mounted on the main body 1 to operate. The driving system may include a driving wheel module. The driving system can issue a drive command to manipulate the cleaning robot to travel across the ground, where the drive command is based on distance information and angle information. The driving wheel module may control both the left wheel and the right wheel simultaneously. Alternatively, the driving wheel module may include a left driving wheel module and a right driving wheel module, such that the left driving wheel module and the right driving wheel module may control the left wheel and the right wheel respectively. The left driving wheel module and the right driving wheel module are symmetrically arranged on the horizontal axis alignment defined by the main body 1. In view of improving the stability of the cleaning robot, the cleaning robot may include one or more driven wheels 72. The driven wheels include but not limited to a caster wheel.

The driving wheel module may include travel wheels, a driving motor, and a control circuit configured to control the driving motor. The driving wheel module may also be connected to a circuit for measuring the driving current and an odometer. The driving wheel module may be detachably connected to the main body 1 to facilitate disassembly and maintenance. The driving wheel may have an offset drop suspension system. The drive wheel is movably fastened, for example, rotatable attached to the main body 1, and receives a spring bias that is biased downward and away from the main body 1. Spring bias allows the drive wheel to maintain contact and traction with the ground with a certain ground force. At the same time, the robot's cleaning element (such as roller brush, etc.) also contact the ground with a certain pressure.

The front part 13 of the main body 1 may carry the bumper. During the cleaning process, the driving wheel module drives the cleaning robot to travel on the ground, and the bumper detects one or more events including an obstacle and a wall in the travel path of the cleaning robot via a sensor, such as an infrared sensor. The cleaning robot may respond to the events, for example, the cleaning robot may move away from the obstacle detected.

Figure 11:
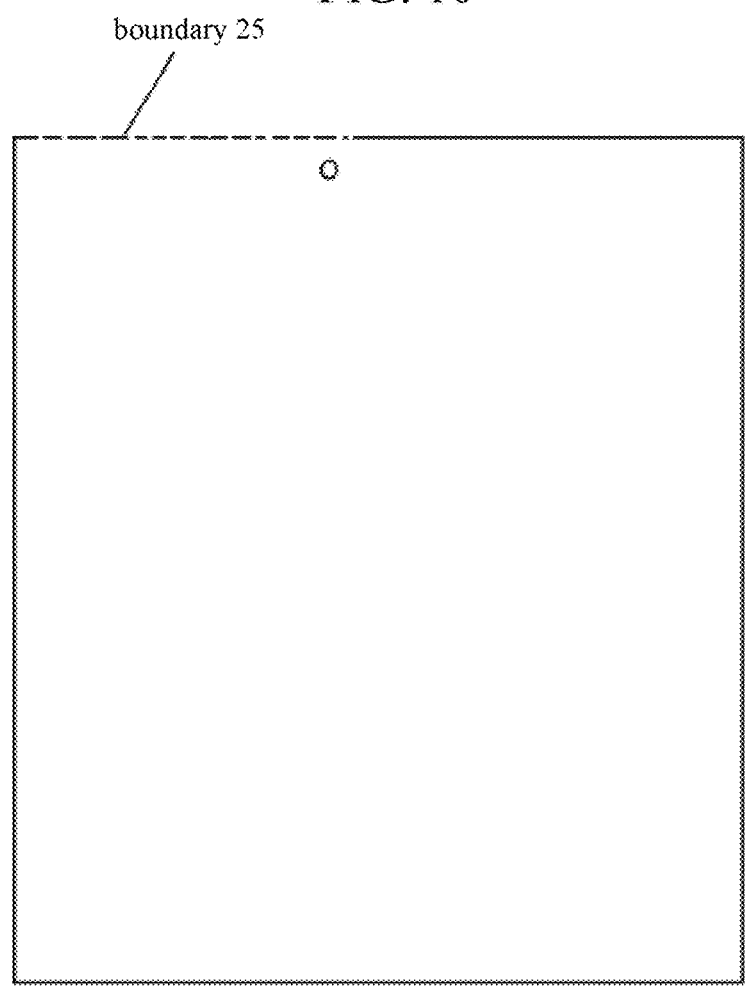
FIG. 11 is a schematic illustration of the boundary of the confined area according to an embodiment of the present disclosure.

Generally, in order to prevent the cleaning robot from entering a confined area (for example, an area placed a fragile item, a floor water-containing area such as a bathroom). In an embodiment, the cleaning robot may include a confined area detector. The confined area detector may include a virtual wall sensor configured to detect a virtual wall, and the virtual wall sensor detects a virtual wall set by the user. The virtual wall defines the confined area, as shown in FIG. 11. When the virtual wall sensor detects the virtual wall, the driving wheel module can be controlled to restrict the cleaning robot from entering the confined area across the boundary 25 of the confined area (e.g., the virtual wall).

Furthermore, in order to prevent the cleaning robot dropping from a staircase, and a step, etc., the confined area detector may further include a cliff sensor. The cliff sensor may detect the boundary set by the user, which defines the confined area, as shown in FIG. 11. When the cliff sensor detects boundary of the confined area (e.g., the cliff edge), the driving wheel module can be controlled to restrict the cleaning robot from crossing the boundary 25 of the confined area (e.g., the virtual wall), thereby preventing the cleaning robot dropping from a step.

The control system provided on the circuit board inside the main body 1. The control system may include a non-transitory memory and a computing processor. The non-transitory memory may include a hard disk, a flash memory or a random-access memory. The computing processor may include a central processing unit, or an application processor. Based on obstacle information fed back by a laser detection sensor, the application processor uses a positioning algorithm, such as SLAM, to generate an instant map of the environment in which the cleaning robot is located. The control system determines the current status of the cleaning robot according to distance information and velocity information fed back by the bumper, the cliff sensor 51, the ultrasonic sensor, the infrared sensor, the magnetometer, the accelerometer, the gyroscope, the odometer and other sensing device. The statuses of the cleaning robot may include that: the clean robot crosses a threshold, the cleaning robot moves on a carpet, the cleaning robot locates on a cliff, the cleaning robot is stuck, the dust container of the cleaning robot is full, and the cleaning robot is lifted, etc. The control system may generate instructions for next step according to different statuses, to make, which makes the cleaning robot better meet the requirement of the user, consequently, the user experience is improved. Furthermore, the control system may determine an efficient cleaning path and cleaning mode based on real-time map information drawn by SLAM, which improves the cleaning efficiency of the cleaning robot.

The power system may include a rechargeable battery, such as a nickel-metal hydride battery and a lithium battery. The rechargeable battery may be coupled to a charging control circuit, a battery pack charging temperature detecting circuit and a battery undervoltage monitoring circuit. The charging control circuit, the battery pack charging temperature detecting circuit and the battery undervoltage monitoring circuit connected with a singlechip control circuit. The cleaning robot is charged by connecting to the charging station with electrodes provided on the lateral side or the lower side of the cleaning robot.

Figure 3:
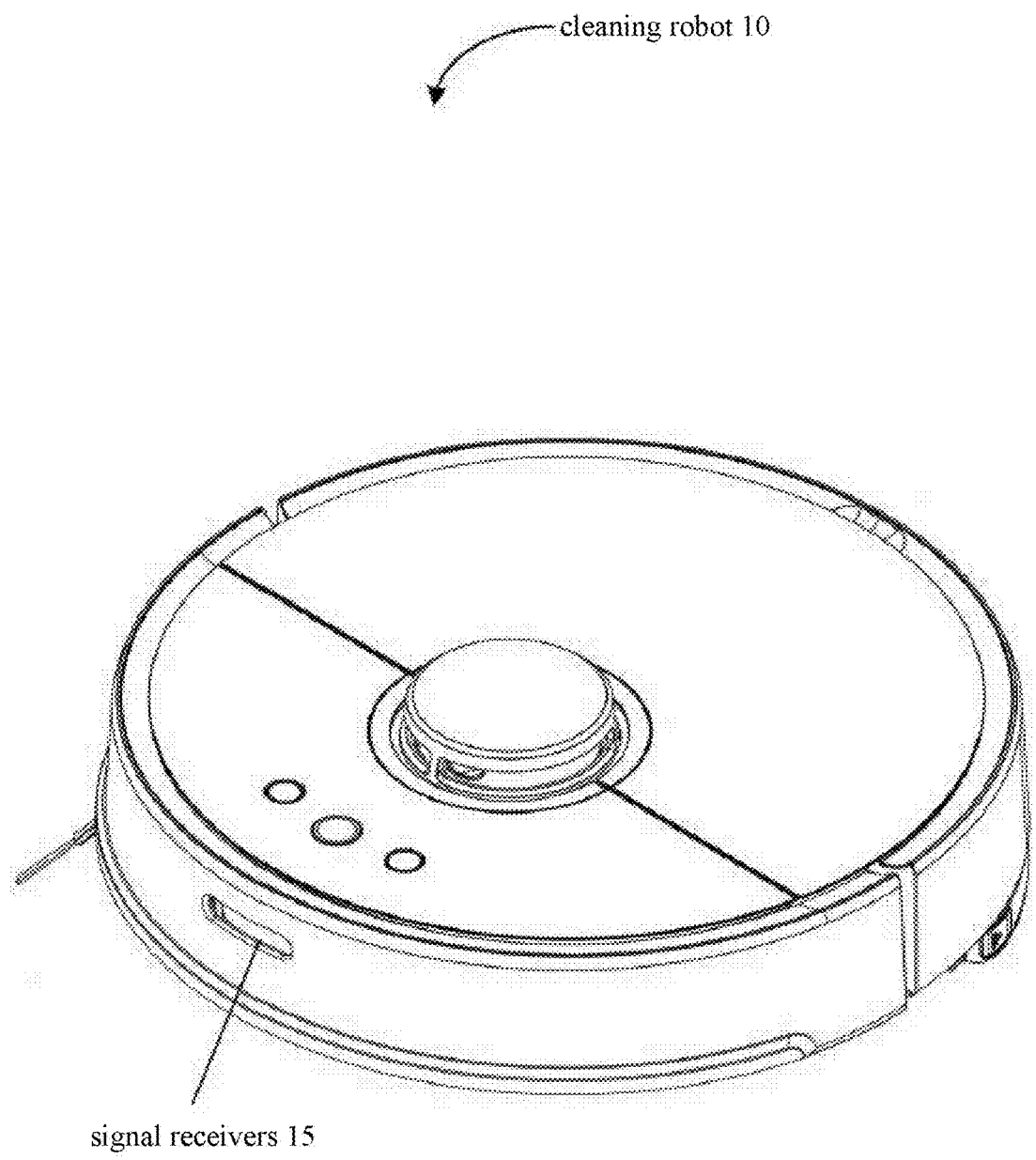
FIG. 3 is another top view of an autonomous mobile robot according to an embodiment of the present disclosure.
Figure 4:
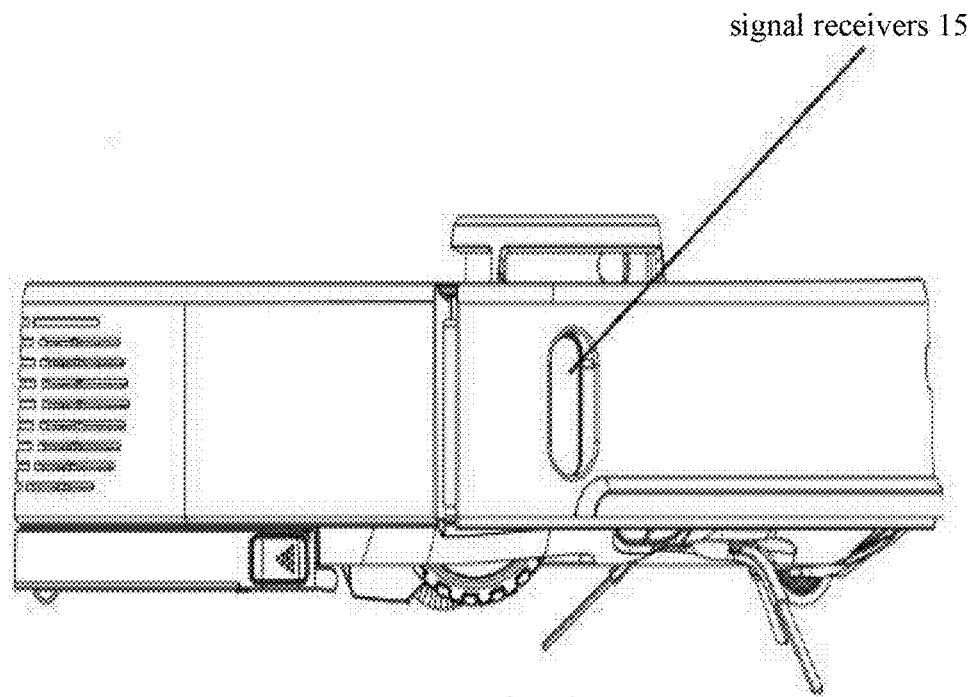
FIG. 4 is a side view of an autonomous mobile robot according to an embodiment of the present disclosure.

As shown in FIG. 3 and FIG. 4, the cleaning robot 10 may be provided with signal receivers 15 at the front part and the right side of the cleaning robot in the traveling direction, for receiving a homing signal from the charging station 21. Normally, when the cleaning robot launches from the charging station 21, the position of the charging station 21 may be recorded. Therefore, when the cleaning robot completes cleaning, or the cleaning robot is in the low energy level, the cleaning robot moves towards to the charging station 21 according to the position of the charging station 21 stored in the memory, and then is charged by the charging station.

The human-machine interaction system 9 includes buttons on a panel for the user to select functions. The human-machine interaction system 9 may further include at least one of a display, an indicator light, and a speaker. The display, the indicator light and the speaker show the current status of the cleaning robot or the function selection items to the user. The human-machine interaction system 9 may also include a mobile client application. The map of the environment around the cleaning robot, and the position of the cleaning robot can be shown to the user by the mobile client application.

In order to describe robot's behavior more clearly, directions are defined as follows. The cleaning robot can travel on the ground by various combinations of movements of the following three mutually perpendicular axes defined by the main body 1: a front and rear axis X (ie, the axis in the direction of the front part 13 and rear part 14 of main body 1), a lateral axis Y (ie, an axis perpendicular to axis X and at a same horizontal plane with the axis X) and a center vertical axis Z (axis perpendicular to the plane formed by axis X and axis Y). The forward driving direction along the front and rear axis X is indicated as "forward", and the backward driving direction along the front and rear axis X is indicated as "backward". The lateral axis Y extends along the axis defined by the center point of the driving wheel module 71 between the right wheel and the left wheel of the cleaning robot.

The cleaning robot can rotate around the Y axis. When the front part 13 of the cleaning robot is tilted upward and the rear part 14 of the cleaning robot is tilted downward, it is defined as "up", and when the front part 13 of the cleaning robot is tilted downward and the rear part 14 is tilted upward, it is defined as "down". In addition, the cleaning robot can rotate around the Z axis. In the forward direction of robot, when the cleaning robot tilts to the right of the X axis, it is defined as "right turn", when the cleaning robot tilts to the left side of the X axis, it is defined as "left turn".

The dust container is mounted in a receptacle by means of buckle and handle. When the handle is pulled, the buckle shrinks. When the handle is released, the buckle extends to a recess of the accommodating cavity that receives the limiting member.

A method for docking an autonomous mobile robot will be described in detail below with reference to FIG. 5 to FIG. 12.

The method for docking an autonomous mobile robot is suitable for the following scenarios. When the autonomous mobile robot does not launch from the charging station 21, the position of the charging station 21 is not stored in the robot's memory. And when the autonomous mobile robot and the charging station 21 are separated by a long distance, the autonomous mobile robot cannot receive the homing signal smoothly. Or when the charging station 21 moves during docking the autonomous mobile robot, the homing signal disappears and the autonomous mobile robot cannot receive the homing signal smoothly. In this case, the autonomous mobile robot cannot be docked smoothly to be charged.

In an embodiment, the method for docking an autonomous mobile robot generally employs a scoring mechanism, controls the autonomous mobile robot to move as close as possible to the charging station 21. However, since the position of the charging station 21 cannot be determined, an optimized manner to dock the autonomous mobile is employed in the embodiments of the present disclosure. Specifically, the autonomous mobile robot moves towards the location where the homing signal was last obtained, and a wide area. In theory, the autonomous mobile robot receives a homing signal more easily on a wide area, and the location where the homing signals was last obtained generally indicates the direction of the charging station.

Figure 5:
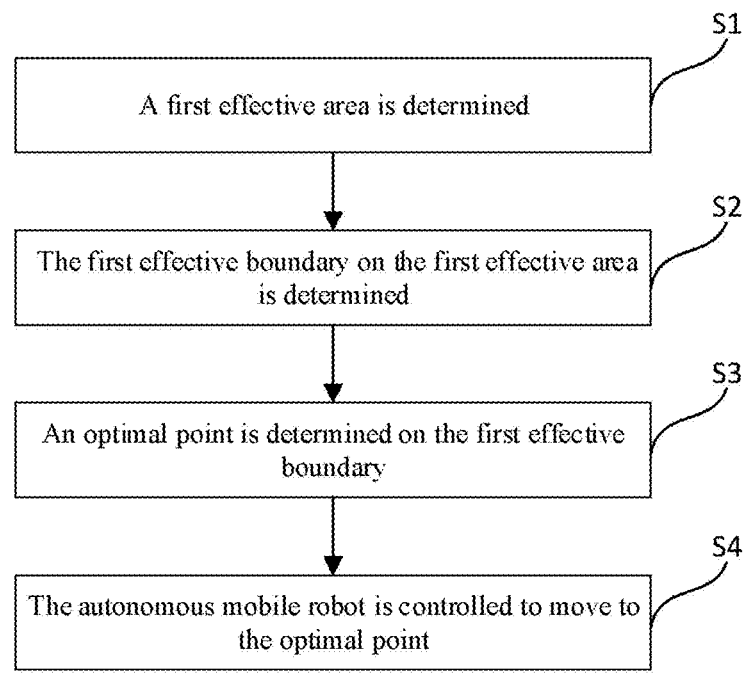
FIG. 5 is a flow diagram of a method for docking an autonomous mobile robot according to an embodiment of the present disclosure.
Figure 6:
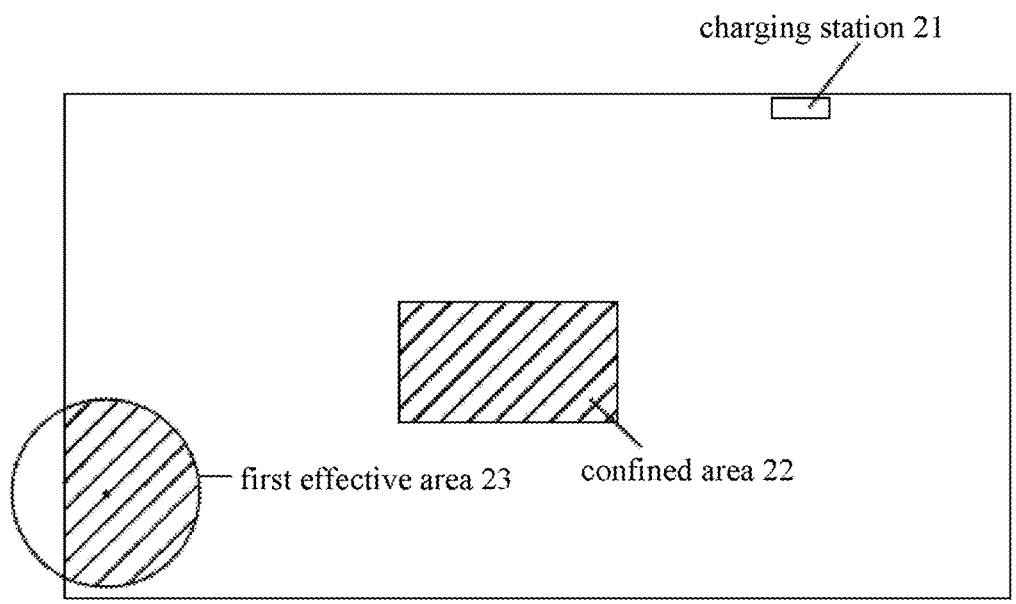
FIG. 6-FIG. 10 are schematic views showing the principle of the method for docking an autonomous mobile robot according to an embodiment of the present disclosure.

Specifically, as illustrated in FIG. 5 and FIG. 6, the processor of the autonomous mobile robot executes the following programs. In step S1, a first effective area 23 is determined.

In some embodiments, a circular area centering on the autonomous mobile robot is determined and a first effective area 23 is determined in the circular area. The radius of the circular area may be determined according to the model of the autonomous mobile robot and the actual area of a work surface. In some embodiments, the radius of the circular area may be 1.5 m. The first effective area 23 is the area without obstacles or confined areas 22. The obstacles may be a wall, a desk, a chair, and the like. The confined area 22 may include a virtual wall and/or a cliff edge. In other words, the first effective area 23 is an area that does not include the obstacle and the confined area 22 in the circular area. For example, the first effective area 23 is a shaded portion in the circular area in FIG. 6.

Figure 7:
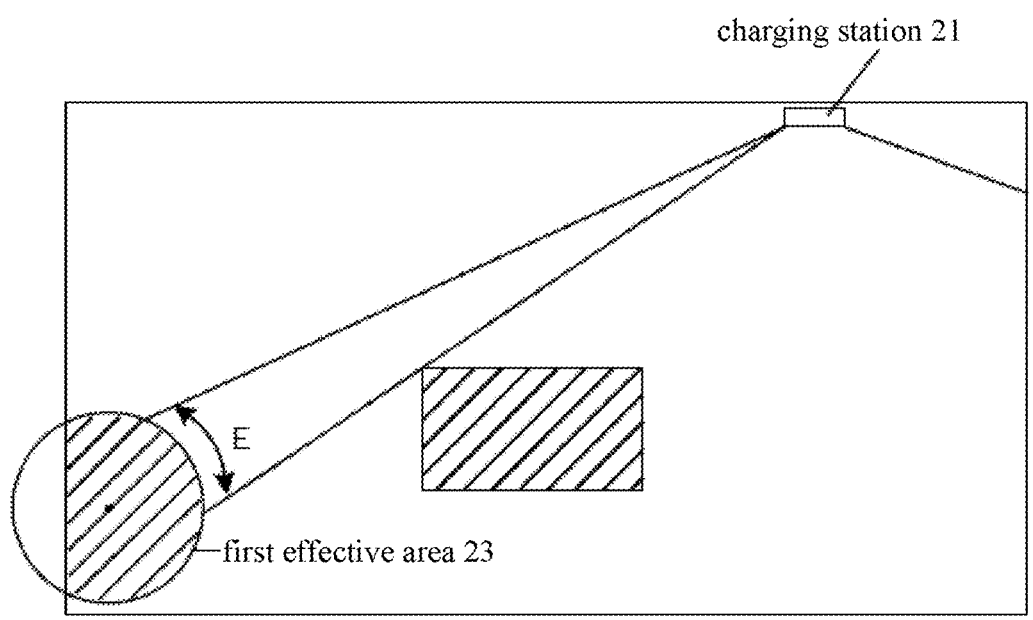

In step S2: the first effective boundary on the first effective area is determined. The first effective boundary is the boundary of a region of the first effective area 23, and the first effective boundary is in the coverage region of the homing signals of the charging station 21 (such as E section as illustrated in FIG. 7).

Step S3 is executed to determine the optimal point on the first effective boundary. The optimal point is a point included in the largest remaining area. The remaining area is defined as an area in the second effective area that does not overlap with the first effective area, and the second effective area is determined centering on the optimal point. The manner in which the optimal point is determined will be briefly described below with reference to FIG. 8 and FIG. 9.

Figure 8:
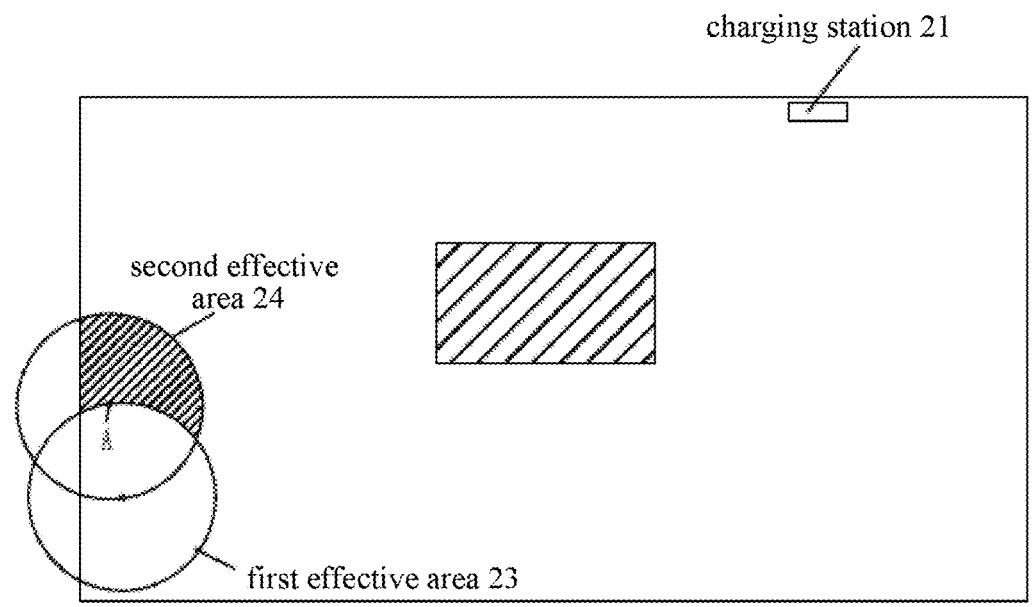

The manner in which the optimal point is determined will be briefly described below with reference to FIG. 8 and FIG. 9. In FIG. 8, point "A" on the first effective boundary is assumed to be an optimal point. A circular area centering on the point A is determined as the second effective area 24. If the overlapping area between the first effective area 23 and the second effective area 24 is the smallest, the A point can be determined as the optimal point. The overlapping area is an area in which the first effective area 23 and the second effective area 24 overlap. In other words, if the remaining area of the second effective area 24 is the largest, the A point can be determined as the optimal point. The remaining area is an area in the second effective area 24, which does not overlap with the first effective area 23. For example, the remaining area is a shaded portion in the second effective area 24 illustrated in FIG. 8.

Figure 9:
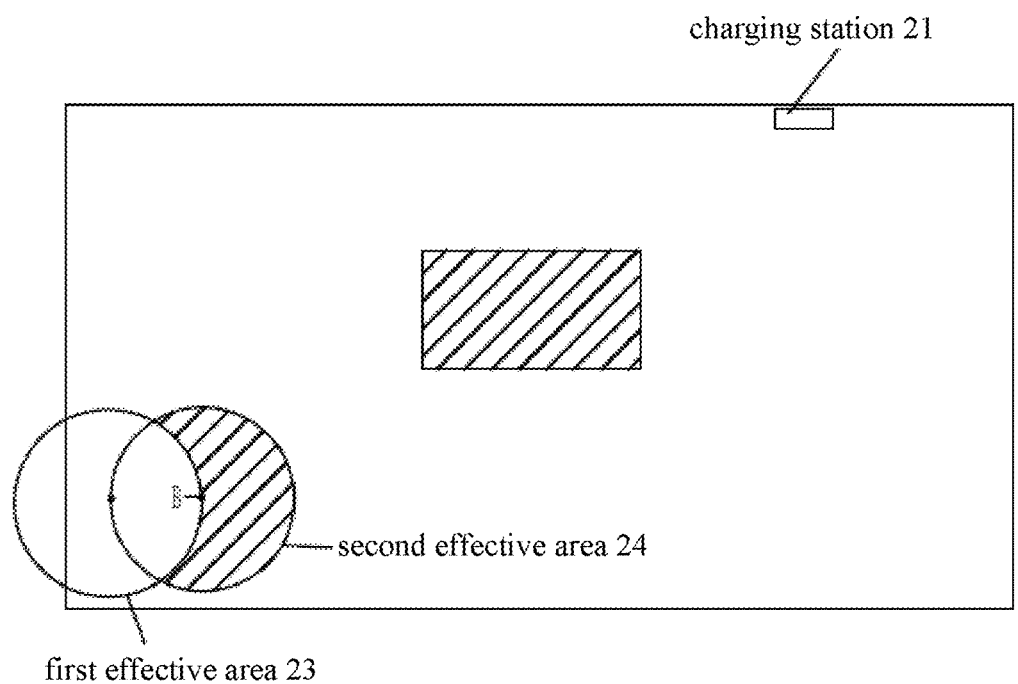

Similar to FIG. 8, the remaining area in FIG. 9 is an area in the second effective area 24 that does not overlap with the first effective area 23, such as the shaded portion in the second effective area 24 illustrated in FIG. 9. In FIG. 9, the second effective area 24 is determined by a point "B". In the embodiment, the remaining area in FIG. 9 is larger than the remaining area in FIG. 8. Therefore, the point "B" in FIG. 9 is determined to be the optimal point.

In practice, the autonomous mobile robot can automatically determine the optimal point through the calculation program running in the processor. In some embodiments, the autonomous mobile robot uses a same detection radius to determine the second effective area 24 and the first effective area 23. That is, the radius of the first effective area 23 is equal to the radius of the second effective area 24.

In step 4, the autonomous mobile robot is controlled to move to the optimal point. Step S1 to step S4 is repeated to make the autonomous mobile robot reach the vicinity of the charging station. That is, the first effective area 23 is determined centering on the autonomous mobile robot, the first effective boundary is determined from the one or more first boundaries of the first effective area 23, and the optimal point continues to be determined on the first effective boundary.

Figure 10:
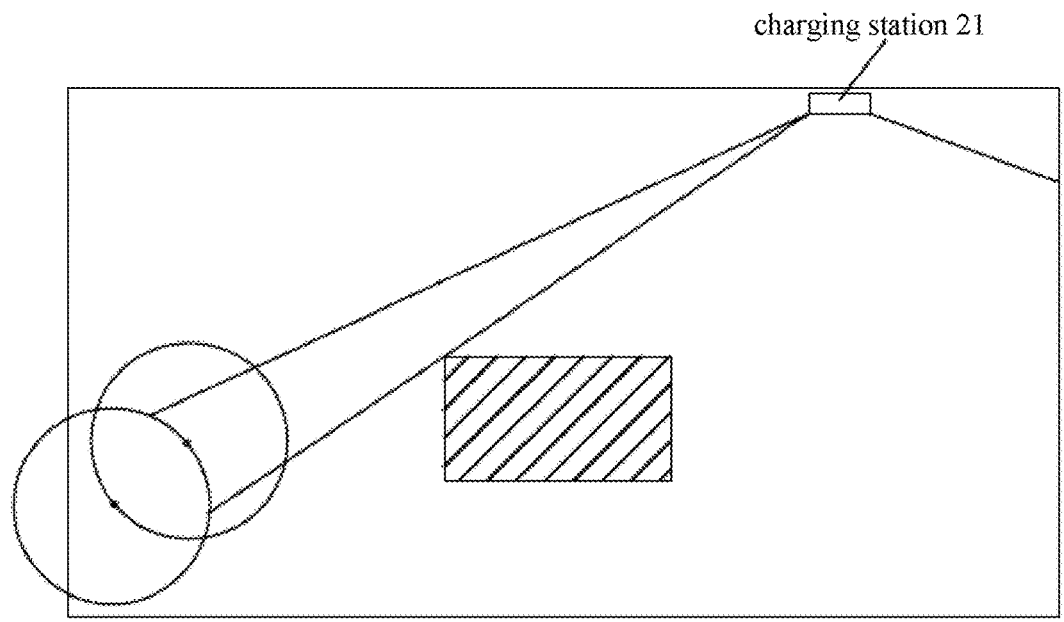

FIG. 10 illustrates at least part of movement route of the autonomous mobile robot. Where the movement route is determined in accordance with the above method for determining the optimal point. In this way, the autonomous mobile robot moves along the direction of the homing signal obtained last time, and moves towards the area as wide as possible. Therefore, the autonomous mobile robot can approach to the vicinity of the charging station efficiently. When the autonomous mobile robot moves to the vicinity of the charging station, the above steps end and the conventional docking method may be performed.

During moving of the autonomous mobile robot, there may be more than one optimal point determined each time. In some embodiment, the weights of all optimal points are the same. In practice, the traversal algorithm of the autonomous mobile robot can determine the next optimal point. In an embodiment, the autonomous mobile robot moves towards a wide area on the basis of the homing signal, to reach the vicinity of the charging station relatively quickly.

In some embodiments, the autonomous mobile robot may include a laser distance sensor (described above). The laser distance sensor is configured to detect the distance between the autonomous mobile robot and the charting station. When the distance detected by the laser distance sensor is equal to a predetermined distance, it is indicated that the autonomous mobile robot is in the vicinity of the charging station. In this case, the autonomous mobile robot can stop the above steps.

In some embodiments, when the distance between the autonomous mobile robot and the charging station is about 70 cm, the autonomous mobile robot can stop the above steps.

In alternative embodiments, the predetermined distance can be set by the user in an application such as a mobile phone application.

In some embodiments, the charging station can emit near-field signals and far-field signals. When the autonomous mobile robot is far from the charting station, the autonomous mobile robot cannot detect the near-field signals, but can detect the far-field signals. When the autonomous mobile robot moves to a position where it can detect the near-field signal, it can be determined that the autonomous mobile robot has reached the vicinity of the charging station, and the autonomous mobile robot can stop the above steps.

Figure 12:
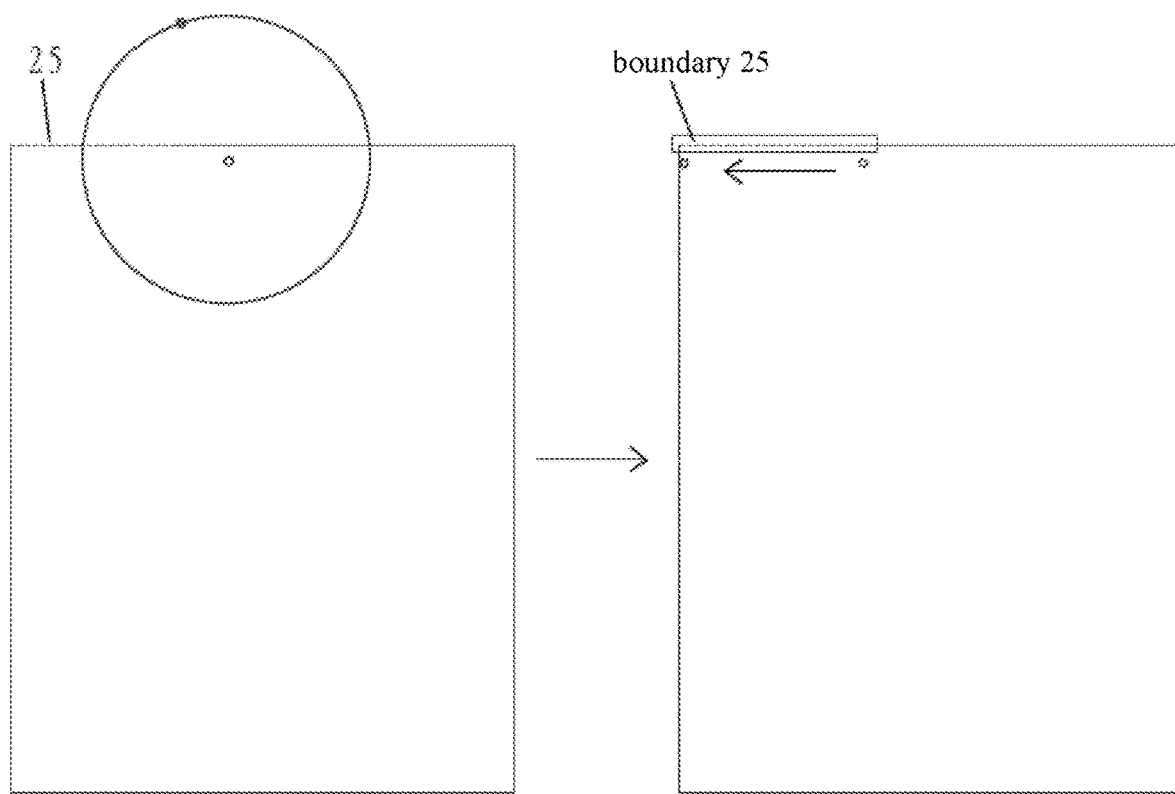
FIG. 12 is a schematic illustration of a route of docking an autonomous mobile robot when encountering a confined area according to an embodiment of the present disclosure.

As illustrated in FIG. 12, when the next optimal point is in the confined area 22, the autonomous mobile robot is controlled to move along the boundary 25 of the confined area 22, such as the boundary of the virtual wall or the cliff, to record the position of the confined area 22. The processor can mark the position of the confined area 22 on a map and store it in the memory, to prevent the autonomous mobile robot entering into the confined area 22.

The present disclosure also discloses a control device, the control device includes a non-transitory memory, a processor, and a computer program. Wherein the computer program is stored on the non-transitory memory and is performed by the processor. When the processor executes the program, the steps of the above are executed. The present disclosure also discloses an autonomous mobile robot and a smart cleaning system, and the autonomous mobile robot and the smart cleaning system include the control device. The smart cleaning system also include the autonomous mobile robot and one or more charging stations.

According to the technical solutions provided by the embodiments of the present disclosure, docking an autonomous mobile robot can be achieved smoothly. If the autonomous mobile robot cannot receive the homing signal from a charging station, or the charging station moves during docking the autonomous mobile robot, docking the autonomous mobile robot can be performed successfully by applying the technical solution of the present disclosure. Consequently, the process of the docking can be achieved without manual operation, which ensures reliability of the autonomous mobile robot and improves the user experience.

Although the example embodiments have been described herein with reference to the drawings, it is understood that the foregoing exemplary embodiments are merely illustrative and are not intended to limit the scope of the disclosure. The skilled in the art can make various changes and modifications therein without departing from the scope and spirit of the disclosure. All such changes and modifications are intended to be included within the scope of the present disclosure as claimed.

In the description provided herein, numerous specific details are set forth. However, it is understood that the embodiments of the disclosure may be practiced without these specific details. In some instances, well-known methods, structures, and techniques are not shown in detail so as not to obscure the understanding of the description.

In addition, those skilled in the art will appreciate that although some embodiments described herein include some features included in other embodiments and don't include other features, combinations of features of different embodiments are meant to be within the scope of the disclosure and to form different embodiments. For example, in the claims, any one of the claimed embodiments can be used in any combination.

What is claimed is:

1. A method for docking an autonomous mobile robot, comprising:
    determining a first effective area, wherein the first effective area is defined by one or more first boundaries, and wherein the autonomous mobile robot is located in the first effective area;
    determining a first effective boundary from the one or more first boundaries of the first effective area, wherein the first effective boundary is in a coverage area of a homing signal of a charging station;
    determining an optimal point from one or more candidate optimal points on the first effective boundary, wherein each of the one or more candidate optimal points defines a respective second effective area centering on the each of the one or more candidate optimal points and overlapping with the first effective area to form a respective overlapping area, wherein a respective overlapping area associated with the each of the one or more optimal points is smallest among respective overlapping areas associated with the one or more candidate optimal points;
    controlling the autonomous mobile robot to move to the optimal point; and
    repeating the determining of the first effective area, the determining of the first effective boundary, the determining of the optimal point and the controlling of the autonomous mobile robot in one or more iterations to make the autonomous mobile robot reach a vicinity of the charging station.

2. The method as claimed in claim 1, wherein the first effective area and the second effective area are areas without obstacles.

3. The method as claimed in claim 2, wherein the obstacles comprise at least a wall.

4. The method as claimed in claim 1, wherein the autonomous mobile robot comprises a confined area detector.

5. The method as claimed in claim 4, wherein the autonomous mobile robot is controlled to move along a boundary of the confined area to approach the optimal point.

6. The method as claimed in claim 5, wherein the boundary of the confined area comprises at least one of a virtual wall or a cliff edge.

7. The method as claimed in claim 6, wherein the confined area detector comprises at least one of a virtual wall sensor or a cliff sensor, wherein the virtual wall sensor is configured to detect the virtual wall, and the cliff sensor is configured to detect the cliff edge.

8. The method as claimed in claim 1, further comprising stopping the one or more iterations when a distance between the autonomous mobile robot and the charging station has reached a predetermined distance.

9. The method as claimed in claim 8, wherein the autonomous mobile robot comprises a laser distance sensor configured to detect the distance between the autonomous mobile robot and the charging station.

10. The method as claimed in claim 1, further comprising stopping the one or more iterations responsive to detect a near-field signal from the charging station.

11. A control device for an autonomous mobile robot, comprising a processor and a non-transitory memory storing a computer program that, when executed by the processor, causes the processor to:
    determine a first effective area, wherein the first effective area is defined by one or more first boundaries, and the autonomous mobile robot is located in the first effective area;

determine a first effective boundary from the one or more first boundaries of the first effective area, wherein the first effective boundary is in a coverage area of a homing signal of a charging station;

determine an optimal point from one or more candidate optimal points on the first effective boundary, wherein each of the one or more candidate optimal points defines a respective second effective area centering on the each of the one or more candidate optimal points and overlapping with the first effective area to form a respective overlapping area, wherein a respective overlapping area associated with the each of the one or more optimal points is smallest among respective overlapping areas associated with the one or more candidate optimal points;

control the autonomous mobile robot to move to the optimal point; and repeat the determining of the first effective area, the determining of the first effective boundary, the determining of the optimal point and the controlling of the autonomous mobile robot in one or more iterations to make the autonomous mobile robot reach a vicinity of the charging station.

12. The control device as claimed in claim 11, wherein the first effective area and the second effective area are areas without obstacles.

13. The control device as claimed in claim 12, wherein the obstacles comprise at least a wall.

14. The control device as claimed in claim 11, wherein the autonomous mobile robot comprises a confined area detector.

15. The control device as claimed in claim 14, wherein the autonomous mobile robot is controlled to move along a boundary of the confined area to approach the optimal point.

16. The control device as claimed in claim 15, wherein the boundary of the confined area comprises at least one of a virtual wall or a cliff edge.

17. The control device as claimed in claim 16, wherein the confined area detector comprises at least one of a virtual wall sensor or a cliff sensor, wherein the virtual wall sensor is configured to detect the virtual wall, and the cliff sensor is configured to detect the cliff edge.

18. The control device as claimed in claim 11, wherein the computer program is further configured to cause the processor to stop the one or more iterations when a distance between the autonomous mobile robot and the charging station has reached a predetermined distance.

19. An autonomous mobile robot, comprising a main body and a control device, and the control device being disposed in the main body;

wherein the control device comprises a processor and a non-transitory memory storing a computer program that, when executed by the processor, causes the processor to:

determine a first effective area, wherein the first effective area is defined by one or more first boundaries, and the autonomous mobile robot is located in the first effective area;

determine a first effective boundary from the one or more first boundaries of the first effective area, wherein the first effective boundary is in a coverage area of a homing signal of a charging station;

determine an optimal point by one or more candidate optimal points on the first effective boundary, wherein each of the one or more candidate optimal points defines a respective second effective area centering on the each of the one or more candidate optimal points and overlapping with the first effective area to form a respective overlapping area, wherein a respective overlapping area associated with the each of the one or more optimal points is smallest among respective overlapping areas associated with the one or more candidate optimal points;

control the autonomous mobile robot to move to the optimal point; and repeat the determining of the first effective area, the determining of the first effective boundary, the determining of the optimal point and the controlling of the autonomous mobile robot in one or more iterations to make the autonomous mobile robot reach a vicinity of the charging station.

20. The autonomous mobile robot as claimed in claim 19, wherein the autonomous mobile robot comprises a cleaning system.

* * * * *